United States Patent
Kolokowsky (10) Patent No.: US 7,752,471 B1
(45) Date of Patent: Jul. 6, 2010

(54) ADAPTIVE USB MASS STORAGE DEVICES THAT REDUCE POWER CONSUMPTION

(75) Inventor: Stephen Henry Kolokowsky, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1187 days.

(21) Appl. No.: 10/911,840

(22) Filed: Aug. 4, 2004

Related U.S. Application Data (60) Provisional application No. 60/504,251, filed on Sep. 17, 2003.

(51) Int. Cl.
*G06F 1/00* (2006.01)
*G06F 13/36* (2006.01)

(52) U.S. Cl. .................. 713/310; 713/300; 710/315

(58) Field of Classification Search .............. 713/300, 713/310; 710/315
See application file for complete search history.

(56) References Cited

U.S. PATENT DOCUMENTS

| | | | |
|---|---|---|---|
| 5,483,656 A * | 1/1996 | Oprescu et al. ............. 713/320 |
| 6,128,743 A | 10/2000 | Rothenbaum | |
| 6,151,651 A | 11/2000 | Hewitt et al. | |
| 6,353,894 B1 * | 3/2002 | Pione ...................... 713/340 |
| 6,438,701 B1 | 8/2002 | Chaiken et al. | |
| 6,442,631 B1 | 8/2002 | Neufeld et al. | |
| 6,523,125 B1 | 2/2003 | Kohno et al. | |
| 6,591,320 B1 | 7/2003 | Cheston et al. | |
| 6,607,139 B1 | 8/2003 | Jui-Chang et al. | |
| 6,633,938 B1 | 10/2003 | Rowlands et al. | |
| 6,725,385 B1 | 4/2004 | Chu et al. | |
| 6,938,108 B2 | 8/2005 | Ohie et al. | |
| 7,010,638 B2 * | 3/2006 | Deng et al. ................. 710/306 |
| 7,197,578 B1 * | 3/2007 | Jacobs ...................... 710/14 |
| 2003/0154340 A1 * | 8/2003 | Bolt et al. .................. 710/305 |
| 2004/0052045 A1 * | 3/2004 | Botchek ..................... 361/685 |

OTHER PUBLICATIONS

USPTO Notice of Allowance for U.S. Appl. No. 10/186,937 dated Nov. 24, 2006; 6 pages.
USPTO Advisory Action for U.S. Appl. No. 10/186,937 dated Jun. 27, 2006; 3 pages.
USPTO Final Rejection for U.S. Appl. No. 10/186,937 dated May 19, 2006; 15 pages.
USPTO Non-Final Rejection for U.S. Appl. No. 10/186,937 dated Dec. 7, 2005; 13 pages.
USPTO Non-Final Rejection for U.S. Appl. No. 10/186,937 dated Jun. 27, 2005; 10 pages.
USPTO Advisory Action for U.S. Appl. No. 10/186,937 dated Mar. 9, 2005; 3 pages.

(Continued)

*Primary Examiner*—Ji H Bae (57) ABSTRACT

A bridge circuit that is located between a peripheral device and a USB connection to a host. The bridge stores data indicating the amount of power required to execute each particular command. When a command is received, the command is executed if this list indicates that a particular command can be executed with the available power. If the list indicates that the command can not be executed with the available power, the command is either rejected or delayed. The bridge may include a power storage device that accumulates and stores power. In this case the list of commands would indicate commands that can be delayed until the storage device has accumulated sufficient power.

20 Claims, 5 Drawing Sheets

OTHER PUBLICATIONS

USPTO Final Rejection for U.S. Appl. No. 10/186,937 dated Nov. 29, 2004; 9 pages.

USPTO Non-Final Rejection for U.S. Appl. No. 10/186,937 dated Jun. 22, 2004; 8 pages.

Steve Kolokowsky, "Design Considerations for USB Mass Storage," Presented at the USB Implementers Forum Inc. (USB-IF), Jun. 12, 2002; 35 pages.

* cited by examiner

ADAPTIVE USB MASS STORAGE DEVICES THAT REDUCE POWER CONSUMPTION

RELATED APPLICATION

The present application is a non-provisional application of provisional application Ser. No. 60/504,251 filed Sep. 17, 2003. Priority of application 60/504,251 is hereby claimed and the entire content of application 60/504,251 is hereby incorporated herein by reference.

FIELD OF THE INVENTION

The present invention relates to computer systems and more particularly to connecting peripheral devices to a host system.

BACKGROUND OF THE INVENTION

The Universal Serial Bus (USB) is a relatively easy to use interface for connecting peripheral devices to a host system. In general when a peripheral device is connected to a host by a USB, the host will auto-detect and auto-configure the device.

The initial type of USB connection which achieved widespread use (referred to as USB 1.1) is defined by the "universal Serial Bus Revision 1.1 specifications. An improved USB which has also gained widespread use (referred to as USB 2.0) is defined by the "Universal Serial Bus Revision 2.0 specification". The specification for both the 1.1 and 2.0 USB interfaces are publicly available and they are incorporated herein by reference.

A USB port may support either one of two power levels. The first power level has a maximum current of 100 ma. The second power level has a maximum current level of 500 ma. Many peripheral devices can operate satisfactorily at the 100 ma power level and other devices can operate satisfactorily at the 500 ma power level. A device that requires more than 100 ma and less than 500 ma must be plugged into a USB port that supports the 500 ma power level. According to the USB specifications, any device that requires more than 500 ma of current must have an own external power supply or batteries.

Among the disadvantages of using an external power supply or batteries are the size and weight of such devices.

SUMMARY OF THE PRESENT INVENTION

The present invention provides a bridge circuit that is located between a peripheral device and a USB connection to a host. The bridge stores data indicating the amount of power required to execute each particular command. When a command is received, the command is executed if this list indicates that a particular command can be executed with the available power. If the list indicates that the command can not be executed with the available power, the command is either rejected or delayed by the bridge.

The bridge may include a power storage device that accumulates and stores power. In this case the list of commands would indicate commands that can be delayed until the storage device has accumulated sufficient power.

DETAILED DESCRIPTION

Several preferred embodiments of the present invention will now be described with reference to the accompanying drawings. The drawings illustrate exemplary preferred embodiments of the invention and the operation of such embodiments. This invention may, however, be embodied in many different forms and the inventions should not be construed as being limited to the embodiments set forth herein. The multiple embodiments described herein are provided so that this disclosure will conveys the concept and scope of the invention to those skilled in the art.

In the drawings, the size of the boxes are not intended to represent the size of physical components. It is noted that the same reference numerals are used to denote the same elements throughout the multiple drawings. Only the relevant parts of the various units are shown and described herein. Those parts and elements not shown are known in the art and are commercially available.

Figure 1A:
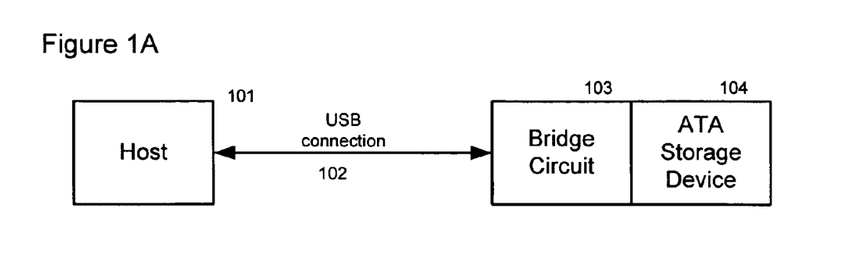
FIGS. 1A, 1B and 1C show three different embodiments of the invention.
Figure 1B:
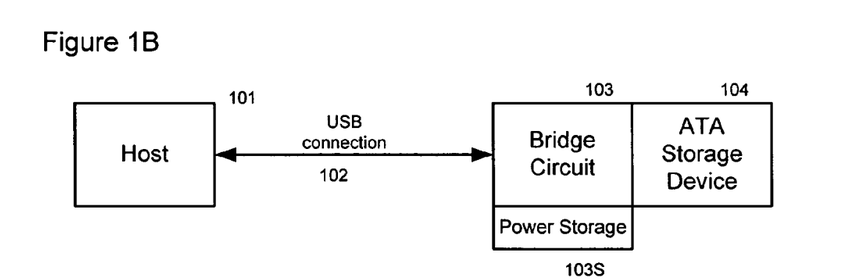
Figure 1C:
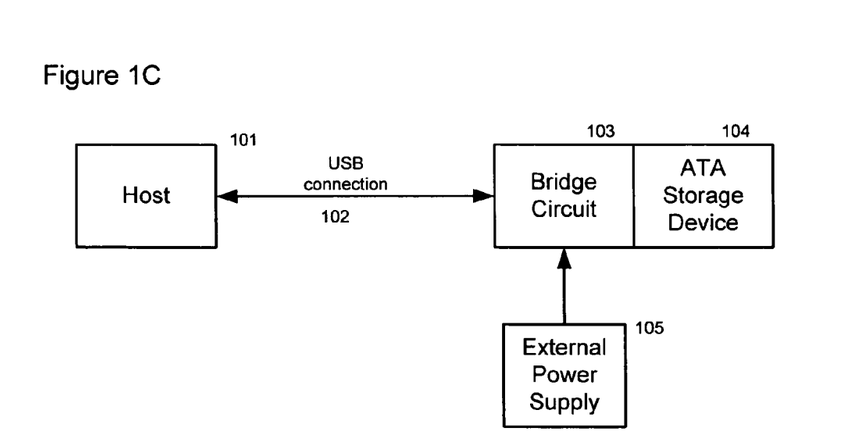

Three embodiments are shown in FIGS. 1A, 1B and 1C. These embodiments include an improved bridge device 103 that connects a host computer 101 to an ATA storage device 104. The ATA storage device 104 could for example be a commercially available hard disk drive. The host computer 101 could be a commercially available personal computer.

Figure 2:
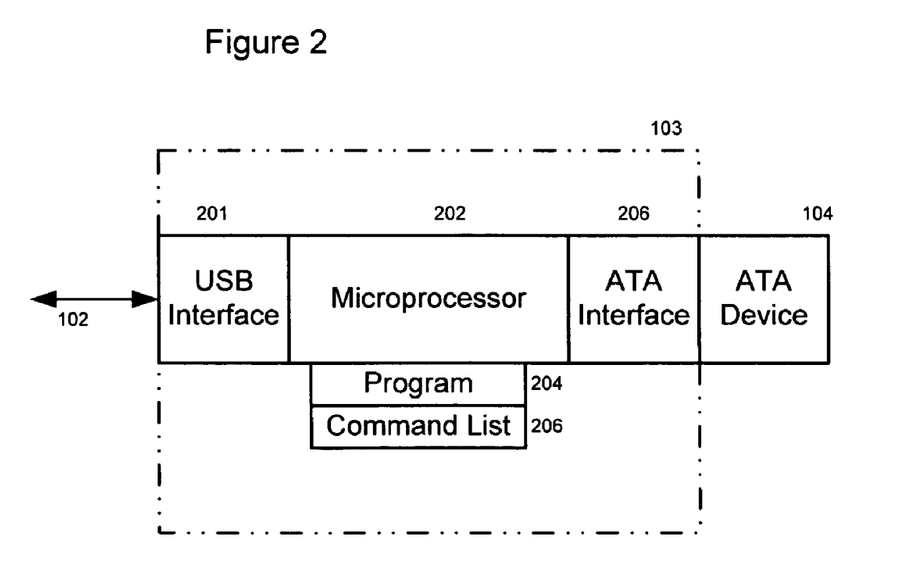
FIG. 2 is a more detailed block diagram for the Bridge circuit.

The host 101 communicates with the storage device 104 via a USB connection 102. The bridge device 103 converts the commands from the USB connection to the ATA commands required by the storage device 104. There are commercially available bridge devices that convert USB commands to ATA commands. However, the bridge 103 has features not present in the prior art bridge circuits. The parts that function to provide this new features are shown in FIG. 2.

The difference between the three embodiments shown in FIGS. 1A, 1B and 1C is as follows. The embodiment shown in FIG. 1A has no power storage or power supply device associated with the bridge circuit. The embodiment shown in FIG. 1B has a power storage device 103S associated with the bridge circuit. The power storage device 103S can be a capacitor array or some other commercially available type of power storage device. The embodiment shown in FIG. 1C has an external power supply. This external power supply would be plugged into and receive power from a normal type of power outlet.

In all the embodiments of the present invention, the amount of power required by the device is not established on a device basis. That is, the bridge circuit 103 takes into account the amount of power required by each particular command. The bridge circuit 103 maintains a list of commands that can be executed using particular amounts of power. The particular commands are only executed if that amount of power is available. For example, the list might be:

Command A: requires 90 ma
Command B: requires 175 ma
Command C: requires 300 ma
Command D: requires 750 ma
Command E: requires 20 ma
Command F: requires 250 ma The commands A to F in the above example would be the commands that a host normally sends to an attached storage device. Each particular type of storage device has a particular set of associated commands.

When the bridge circuit receives a command, it interrogates the list and it checks to see how much power is available. If sufficient power is available, the command is executed. If there is not sufficient power available the command is either delayed (in the embodiment where there is a power storage device) or the host is notified that the command can not be executed. This list of commands is stored in the bridge at the time that the bridge is manufactured or set up for use with a particular ATA storage device.

In the first embodiment shown in FIG. 1A, all of the power comes from the host via the USB connection. Thus, commands can only be executed if the power requires is less than (or equal to) the amount of power available from the USB port to which the device is connected. If the bridge is connected to a 100 ma USB port, only commands that require 100 ma or less or power can be executed. If the bridge is connected to a 500 ma USB port, only commands that require 500 ma or less or power can be executed.

In the second embodiment shown in FIG. 1B, the bridge circuit 103 includes a power storage device 103S. The power storage device 103S can be a capacitor array or some other type of re-chartable power storage device. In this embodiment, a command can be executed if the power available from the host, plus the power available for the storage device is sufficient for the particular command. Since the storage device 103S is a chargeable storage, in some cases, delaying a command may give the storage device time the re-charge so that the command can be executed.

Figure 3A:
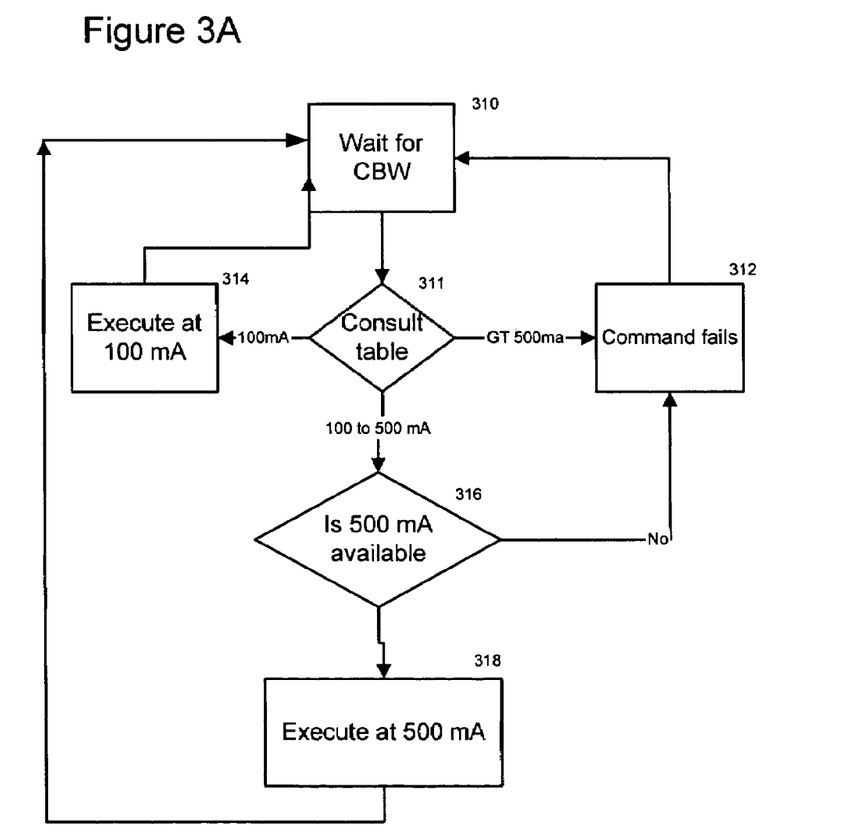
FIGS. 3A, 3B and 3C are program flow diagrams that shows the operation of the embodiments.
Figure 3B:
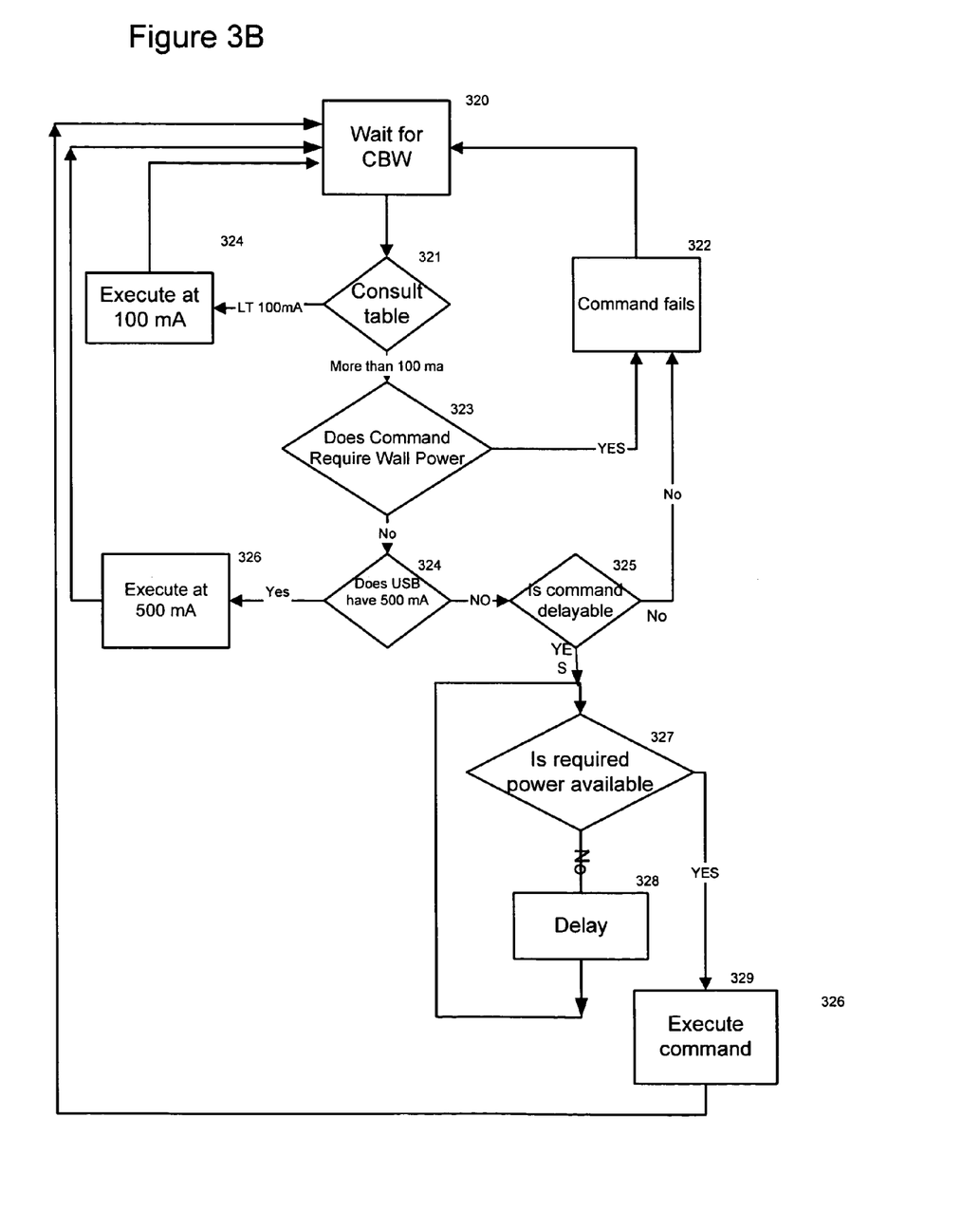
Figure 3C:
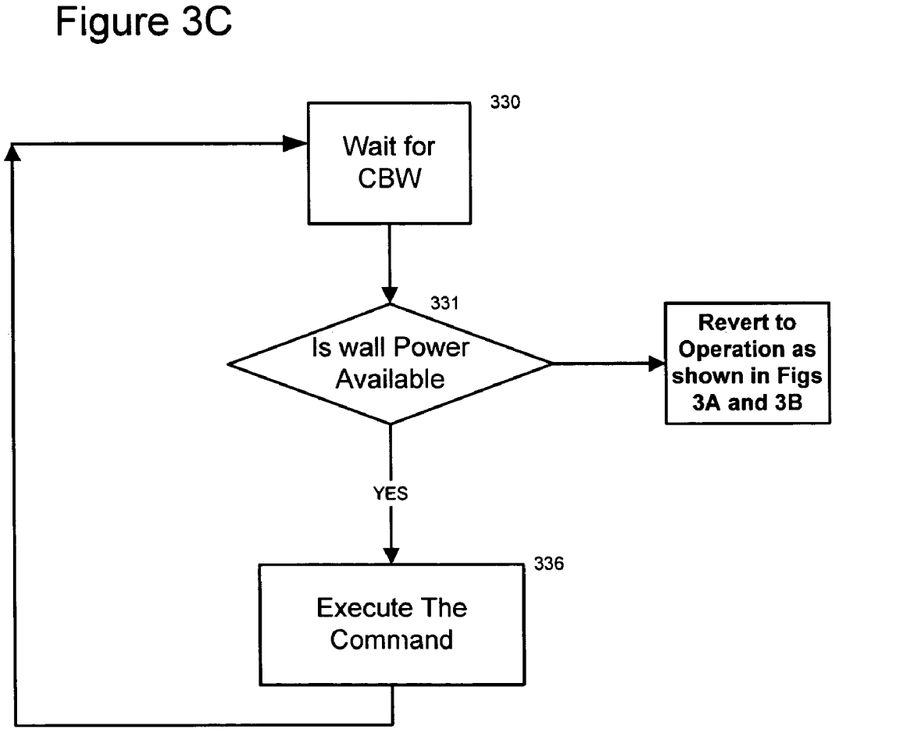

In the third embodiment shown in FIG. 3C, there is an external power supply. In some cases, this external power supply might be large enough that all commands received by the bridge can be executed. In other cases the external supply might be a small supply so that only certain commands can be executed not withstanding the existence of the external supply.

It should also be understood that the three embodiments shown in FIGS. 1A, 1B and 1C are not mutually exclusive. For example a bridge might be capable of having an external power connection but it may also be able to work without such a connection. In such a situation, when there is no external supply, the system would operate as shown in FIG. 1A and when there is an external supply the system would operate as shown in FIG. 1C.

The internal details of the bridge circuit 103 are shown in FIG. 2. Similar to commercially available bridge circuits, the bridge circuit 103 includes a USB interface 201, a microprocessor 202 and an ATA interface 206. The microprocessor 202 is controlled by a program 204. In the embodiments shown herein the bridge also has a command list storage device 206. A list of commands and the amount of power required by each, plus an indication as to whether the particular command can be delayed is stored in storage device 206. The information stored in device 206 is herein called a command table or a command list.

The general purpose of the bridge and its general function is to take commands and data from USB interface 201 and to transform the commands and data so that they conform to the requirements of ATA interface 206. This is a normal type of transformation that is done by commercially available bridge circuits.

The present invention adds some additional functionality to the bridge circuit. The additional functionality is that provided by a program 205 that works in conjunction with a command table 206. The command table 206 lists the amount of power required to execute each of the commands that can come from host 101 via USB connection 102.

The program 205 examines each command received from the interface 201 and determines if the unit has sufficient power to execute the particular command. If there is not sufficient power a determination is made as to whether sufficient power would be available if execution of the command were delayed.

Thus program 205 and table 206 determine if each command received should be executed, delayed or rejected. The determination is made by examining the entries in table 206. A flow diagram of how these operations are performed is given in FIGS. 3A, 3B and 3C.

It should be understood that the flow diagrams shown in FIGS. 3A, 3B and 3B merely show one particular way of performing the necessary operations. A wide variety of alternate flow diagrams and alternate programs are possible.

FIG. 3A is a program flow block diagram for the embodiment shown in FIG. 1A. In the embodiment shown in FIG. 1A, the bridge circuit does not have any temporary power storage and there is no external power source.

FIG. 3B indicates the program flow for the embodiment shown in FIG. 1B. In the embodiment shown in FIG. 1B, the bridge circuit does have a temporary power storage; however there is no external power source.

FIG. 3C indicates the program flow for the embodiment shown in FIG. 1C. In the embodiment shown in FIG. 1A, the bridge circuit has an external power source.

It should be understood, that similar to the commercially available bridge circuits that are designed to connect a USB interface to an ATA interface, the bridge circuit described herein includes programs executed by the microprocessor to perform a variety of standard operations. These programs are not shown or described herein since they are not particularly relevant to the present invention and since they are described in the publicly available literature concerning commercially available bridge circuits. Only the added functions pertinent to the present invention are described herein.

For an explanation of the functions normally provided by a bridge circuit, example, see a paper entitled "Design Considerations for USB Mass Storage" by Steve Kolokowsky dated Jun. 12, 2002. This paper was presented at the June 2002 conference held by USB Implementers Forum, Inc (often abbreviated USB-IF) and it is publicly available from USB Implementers Forum web site. See also the publicly available literature concerning commercially available bridge circuits such as the literature describing the bridge circuit marketed by IOI Technology Corporation under the designation USB-122SD1B. The USB 122SDD1B is a USB 2.0 to EIDE bridge board that includes the M5621 High-Speed USB 2.0 to ATA/ATAPI Native Bridge Controller from Acer Laboratories. There is also a large amount of other publicly available literature that describes commercially available USB to ATA bridge circuits and the normal operations that they perform.

The operation of the embodiment shown in FIG. 1A will be explained first. FIG. 3A provides a program flow diagram of the operations performed under control of program 204. The embodiment shown in FIG. 3A does not have any temporary power storage and it does not have any external power source. Thus for this embodiment, the table 206 merely lists the commands that can be performed with 100 ma or less of power, those that can be performed with 500 ma or less of power and those that must be rejected.

The process begins with the bridge waiting to receive a Command Block Wrapper (CBW) from the host 101. As specified by the USB specifications, commands are send over the USB with a CBW. A command from the host would be a command to instruction the ATA device 104 to perform some operation such as a read or write operation. The fact that the bridge is waiting for a CBW is indicated by block 310. When the command is received, the table 206 is interrogated to determine how much power is required by the particular command. This table look up operation is indicated by block 311.

If the particular command requires more than 500 ma of power (in this particular simple embodiment) the command would fail as indicated by block 312 and the bridge would return to the wait state indicated by block 310. Command failure would be indicated to the host by an appropriate error code which would indicate that the host should not re-try the command. If the command can be executed with 100 ma or less power, the program executes the command (in a normal manner) as indicated by block 314. If the command requires more than 100 ma and less than 500 ma, a test is made to determine if the USB connection has 500 ma of power available. If the power is available the command is executed as indicated by block 318. If the power is not available the command fails as indicated by the connection to block 312.

Thus, in the first simple embodiment shown in FIG. 3A, after each particular command is received from the host, the table is interrogated to determine if the amount of power available to execute the particular command. If the required power is available, the command is executed, if the power is not available the command fails. For example, with this embodiment, read commands might be executed, but write commands would not be executed. This is in contrast to the prior art systems whereby a device attached to a USB port operates in either the 100 ma mode or the 500 ma mode and all commands for the particular device must fall within the particular devices power requirements. With the present invention, the power required by each particular command can be established.

FIG. 3B illustrates the operation of the embodiment shown in FIG. 1B. The embodiment shown in FIG. 1B has a power storage device 103S. The power storage device 103S, takes what power is available from the USB and stores this power. The power device 103S charges up over time. It may for example be one or more capacitors that are gradually charged. In this embodiment the table 206 also stores information concerning delaying commands. This information indicates if each command can be delayed if power to execute that command is not available at that time but will be available later.

The operation of the embodiment shown in FIG. 1B is shown in FIG. 3B. As with the previous embodiment, the process starts with the device in a wait state. At this point the device is waiting for a CBW from the host. While it is in wait state the device keeps track of the amount of wait time. The reason for this is that the storage device 103S charges over time and hence, by knowing the amount of time since the last command, the bridge can determine if the storage device has had enough time to fully charge.

As indicated by block 321, when a command is received, the bridge circuit interrogates the table 206 to determine the amount of power required for the particular command.

As indicated by block 324, if the command requires 100 ma or less of power, the command is executed since enough power is necessarily available. If more the 100 ma of power is required, a test is made (block 323) to determine if wall power is required. It is noted that the embodiment in FIG. 2B does not have wall power so if wall power is required the command fails.

Next as indicated by blocks 324 and 326, the command is executed if it can be executed with less than 500 ma of power and if the particular USB connection supports 500 mA. Next as indicated by block 325, a test is made to determine if the command can be delayed. If the power store does not have enough storage capability to allow the command to be executed, the command is failed. An example of this situation is a CDRW write command failing on a device with a small capacitor for power storage. If the power store is capable of providing enough power to complete the command, the command is delayed until enough power is accumulated in the power store. Note that command delays can simply be a pause before the command is executed or a simulated UDMA failure on the command which will cause the host to retry the command. That is, a simple delay is merely a delay, the length of which is less than the host time out period.

The second type of delay sends a command to the host, prior to the end of the host time out period, which tells the host to resend the command.

If the command can be delayed, it is delayed as indicated by blocks 327 and 328 and then when the power is available it is executed as indicated by block 329.

The embodiment shown in FIG. 1C is an embodiment with wall power. The operation of this embodiment is shown in FIG. 3C. Basically this embodiment merely need determine if wall power is available as indicated by block 331. If wall power is available the command is executed. If wall power is not available the system reverts to the type of operation shown in FIGS. 3A and 3B.

It is noted that another alternate embodiment utilizes a state machine in place of the microprocessor 202. It is also noted that other embodiments can use the principles of this invention with other interfaces such as with a 1394, PCMCIA, or PCI interfaces. A wide variety of such interfaces are available and other will no doubt be developed.

It is noted that the embodiment shown in FIG. 1B can use a simple delay, whereby a command is merely delayed by an amount less than the processor time out or the delay can be the type of delay which sends an error code to the host telling the host to retry the command.

While the invention has been shown and described with respect to various preferred embodiments thereof, it should be understood that various changes in form and detail may be made without departing from the spirit and scope of the invention. The scope of applicant's invention is limited only by the appended claims.

I claim:

1. A bridge device for connecting a host computer to an ATA storage device via a Universal Serial Bus (USB) comprising in combination:
   a USB interface which receives USB commands from said host via said USB,
   a ATA interface which provides ATA commands to said ATA storage device,
   a memory for storing information concerning the amount of power required by each particular USB command,
   a microprocessor and an associated program which interrogates said memory each time a command is received on said USB interface to determine the amount of power required to execute said command, wherein the associated program determines whether sufficient power is available for executing the command based on whether a particular power supply is connected with the ATA storage device, and wherein the program executes said command if sufficient power is available, and if sufficient power is not available, the program determines if said command is able to be delayed, wherein the program delays execution of said command if said command can be delayed and the program fails said command if said command is not able to be delayed.

2. The bridge device recited in claim 1 which includes a power storage device.

3. The bridge device recited in claim 2 wherein said command is delayed if sufficient power will be available at a later time.

4. The bridge device recited in claim 1 wherein said microprocessor and said associated program determine if a command requires 100 ma or less of power or if a command requires 500 ma or less of power.

5. The bridge device recited in claim 1 wherein said bridge circuit includes program storage for said program.

6. The bridge device recited in claim 1 wherein said commands are received in Command Block Wrappers (CBWs).

7. The bridge device recited in claim 1 wherein said bridge device transforms commands received on said USB interface to ATA commands.

8. A method of operating a bridge circuit which is located between a Universal Serial Bus (USB) connection to a host computer and an peripheral device with a particular interface, said method including,
   examining each command received on said USB to determine the amount of power required to execute said command,
   determining whether sufficient power is available for executing said command based on whether a particular power supply is connected with the peripheral device,
   transferring said command to said particular interface only if sufficient power is available to execute said command,
   if sufficient power is not available, determining if said command is able to be delayed, and delaying execution of said command if the command is able to be delayed, and
   failing said command when said command is not able to be delayed.

9. The method recited in claim 8 wherein delaying execution of said command occurs if sufficient power will be available at a later time.

10. The method recited in claim 8 wherein said bridge circuit includes a power storage device.

11. The method recited in claim 8 wherein said peripheral device is a data storage device.

12. The method recited in claim 8 wherein said peripheral device is an ATA storage device.

13. The method recited in claim 8 wherein said particular interface is an ATA interface.

14. A bridge device for connecting a host computer to a first device with a particular interface via a Universal Serial Bus (USB) comprising in combination:
   a USB interface which receives USB commands from said host via said USB,
   an interface which provides commands with said particular interface to said first device,
   a memory for storing information concerning the amount of power required by each particular USB command, and
   an execution device which interrogates said memory each time a command is received on said USB interface to determine the amount of power required to execute said command, wherein the execution device determines whether sufficient power is available for executing the command based on whether a particular power supply is connected with the first device, and wherein the execution device executes said command if sufficient power is available, and if sufficient power is not available, the execution device determines if said command is able to be delayed, wherein the execution device delays execution of said command if said command can be delayed and fails said command if said command is not able to be delayed.

15. The bridge device recited in claim 14 wherein said execution device is a microprocessor and an associated program.

16. The bridge device recited in claim 14 wherein said execution device is a state machine.

17. The bridge device recited in claim 14 wherein said particular interface is an ATA interface.

18. The bridge device recited in claim 14 wherein said first device is a data storage device.

19. A bridge for connecting a host computer to a peripheral device with a particular interface via a Universal Serial Bus (USB) comprising in combination:
   USB interface means which receives USB commands from said host via said USB,
   second interface means which provides commands with said particular interface to said peripheral device,
   memory means for storing information concerning the amount of power required by each particular USB command,
   means for interrogating said memory each time a command is received on said USB interface to determine the amount of power required to execute said command,
   means for determining whether sufficient power is available for executing the command based on whether a particular power supply is connected with the peripheral device,
   means for executing said command if sufficient power is available,
   means for determining if said command is able to be delayed, and delaying execution of said command if the command is able to be delayed if sufficient power is not available, and
   means for failing said command if said command is not able to be delayed.

20. The bridge recited in claim 19 wherein said means for interrogating is a microprocessor and an associated program.

* * * * *